United States Patent [19]
Long

[11] 3,715,452
[45] Feb. 6, 1973

[54] POROUS FLUID COOLED ELECTRICAL CONDUCTORS
[75] Inventor: Hugh M. Long, Tonawanda, N.Y.
[73] Assignee: Union Carbide Corporation, New York, N.Y.
[22] Filed: Jan. 21, 1972
[21] Appl. No.: 219,714

Related U.S. Application Data

[62] Division of Ser. No. 875,326, Nov. 10, 1969, Pat. No. 3,636,620.

[52] U.S. Cl. ........174/15 C, 174/126 R, 174/DIG. 6, 335/216
[51] Int. Cl. ..........................H01b 7/34, H01b 5/00
[58] Field of Search ..174/15 R, 15 C, DIG. 6, 126 R, 174/126 CP, 128; 335/216; 333/99 S

[56] References Cited

UNITED STATES PATENTS

| 3,610,809 | 10/1971 | Eigenbrod | 174/15 C |
| 3,349,161 | 10/1967 | Latham | 174/DIG. 6 |
| 2,797,392 | 6/1957 | Clogston | 174/126 R |
| 3,371,145 | 2/1968 | Camille, Jr. | 174/15 R |

Primary Examiner—Bernard A. Gilheany
Assistant Examiner—A. T. Grimley
Attorney—Thomas I. O'Brien et al.

[57] ABSTRACT

Fluid cooled, high current capacity electrical conductors manufactured by spirally rolling or winding porous metal sheet into a desired shape.

8 Claims, 2 Drawing Figures

POROUS FLUID COOLED ELECTRICAL CONDUCTORS

This application is a division of application Ser. No. 875,326 filed Nov. 10, 1969, now U.S. Pat. Ser. No. 3,636,620.

This invention relates to cryogenically cooled electrical conductors and to a method for making same.

In superconducting power transmission systems the conducting metal must be arranged such that resistive and conductive heat can be readily removed by cooling fluid provided to maintain the conductive metal at low or superconducting temperatures. It follows that conductors having high heat transfer surface area per unit volume of conductor are desirable to ensure that resistive and conductive heat are removed effectively. Although fluid cooled electrical conductors are not new, the prior art has not disclosed a satisfactory fluid cooled conductor having extremely high current capacity which can be simply manufactured.

An object of this invention is to provide a fluid cooled electrical conductor having high current carrying capacity, which conductor can be easily manufactured.

Another object is to provide a method of making high current capacity, fluid cooled electrical conductors.

Other objects will be apparent from the disclosure, drawings and appended claims.

SUMMARY OF THE INVENTION

Disclosed herein is a porous metal, fluid cooled, electrical conductor comprising spirally wound electrically conductive porous metal sheet, means for introducing and removing electrical current joined to each end of such wound metal sheet; fluid impermeable electrically nonconductive means disposed on at least the outer surface of such wound metal sheet; and fluid conduit means disposed at each end of said metal sheet arranged to introduce cooling fluid at one end and discharge warmed fluid at the other end of said wound porous metal sheet after flow therethrough. Such conductors can have longitudinally varying or constant cross-sectional areas.

Also disclosed herein is a method for manufacturing a porous metal, fluid cooled, electrical conductor which comprises: (a) providing electrically conductive porous metal sheet; (b) spirally winding said metal sheet; (c) joining an electrically conductive end connector to each end of the wound porous metal sheet; (d) attaching fluid conduit means to each end of said wound porous metal sheet; and (e) covering the outer surface of said wound porous metal sheet with an electrically nonconductive, fluid impermeable material.

DETAILED DESCRIPTION

Figure 1:
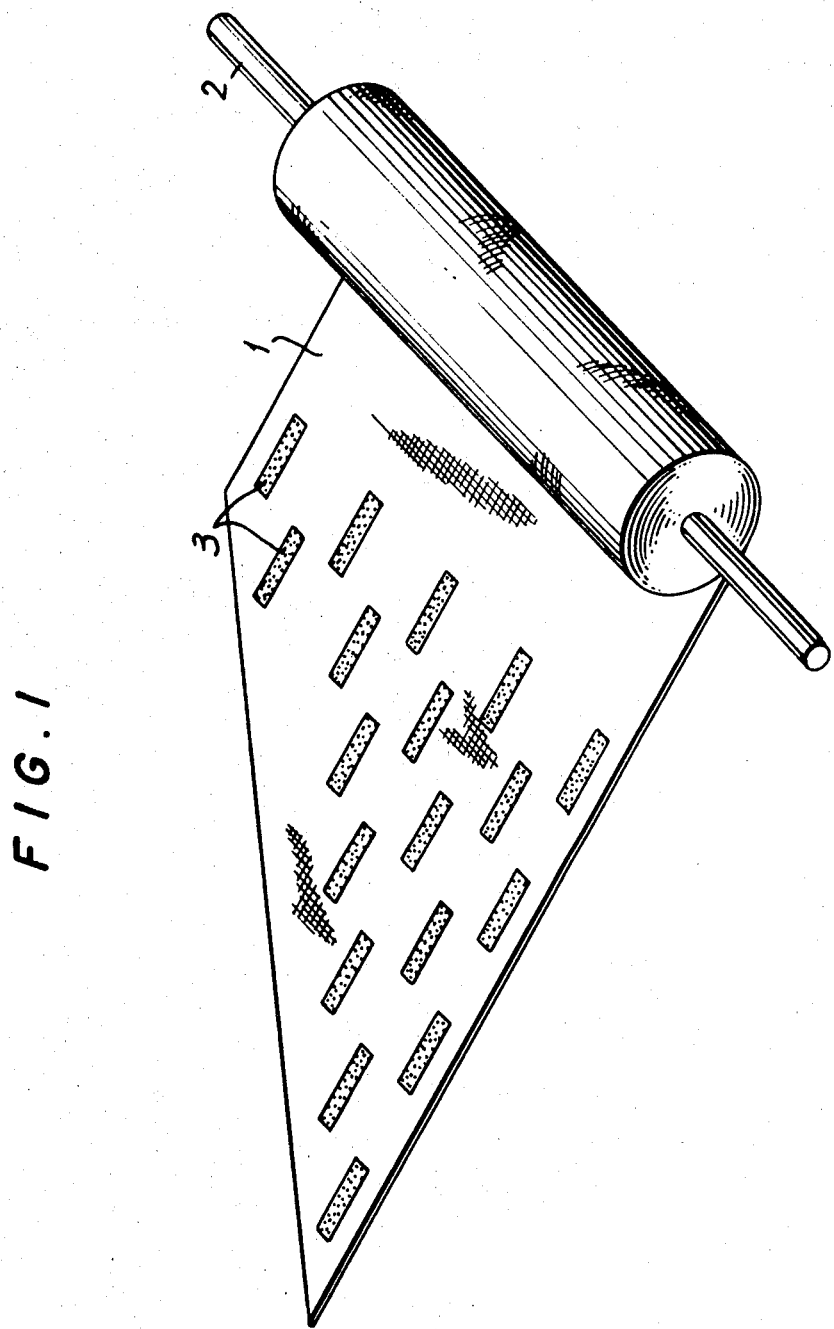
FIG. 1 is a perspective view of a screen wire conductor in the process of being wound.

It has been found that cryogen cooled conductors capable of conducting many thousands of amperes of electricity can be made in relatively small size from porous metal sheet such as screen wire which is spirally wound into a desired shape. In operation, cryogenic coolant is passed through the porous conductor to cool same and to maintain a desired temperature profile therein. The spirally wound porous metal sheet forms an electrically conductive porous structure having a ratio of void space volume to total volume such that cooling fluid may pass therethrough with low resistance. A useful void space range based on adequate heat transfer surface, low resistance to coolant flow and structural strength considerations has been determined from experiments and calculations to be about 50 to 95 percent void. Although the preferred porous metal sheeting is screen wire, expanded metal sheeting, perforated metal sheeting and the like may also be used for constructing fluid cooled electrical conductors of this invention.

Conductors of this invention may be manufactured with various cross-sectional shapes such as circular, annular, elliptical and substantially flat. Also, two or more such porous metal conductors can be concentrically arranged and cooled together or individually. In addition, should a longitudinally varying cross-sectional area be desired, the porous metal sheet can be cut to a pattern prior to spiral winding, which pattern when wound yields the desired cross-sectional area variation with conductor length.

The spirally wound porous metal conductor of this invention may have warm and cold ends each with cross-sectional areas which exceed the cross sectional area of the central portion of the conductor. Although this particular configuration is a separate invention claimed in copending application Ser. No. 875,115 filed Nov. 10, 1969, now U.S. Pat. Ser. No. 3,610,809, in the name of Lester K. Eigenbroad the method of the instant invention may be used to manufacture a conductor of such configuration.

Improved transverse electrical conduction can be obtained by means of bonding contiguous windings together, e.g., by placing solder or other suitable electrically conductive bonding material on the metal screen wire in the area of varying cross-section and bonding such contiguous screen wire windings subsequent to or during spiral winding of the conductor, for example, as by applying appropriate heat to solder coated windings.

Fluid cooling can best be accomplished by covering the exposed conductor surface with an electrically nonconductive, fluid impermeable material to ensure that cooling fluid will flow substantially longitudinally through the porous metal sheet thereof. Hollow conductors would have both their inner and outer surfaces covered.

Examples of nonconductive, impermeable covering materials are thin walled heat shrinkable plastic tubing, polyimide sheet film, polytetrafluoroethylene sheet and polyurethane impregnated crepe paper. Epoxy is a suitable sealant and adhesive.

End connectors which provide convenient electrical terminal connections to the porous metal conductor as well as distribute electrical current flow uniformly over the ends of the spirally wound porous metal sheet are a required part of this invention. Additionally, such end connectors can be arranged to permit passage of cooling fluid through the wound porous metal portion of the conductor by means of appropriate passage or conduit means within or attached to said end connectors. Bonding of the end connectors to the wound porous metal portion can be accomplished by soldering, metal casting or other metal bonding methods. The end connectors may be cast in contact with the wound porous metal sheet thereby achieving both the fabrication of the end connector and its bonding to the wound porous metal sheet in one step.

FIG. 1 depicts a manufacturing method of this invention. Screen wire sheet 1 has been partially wound around mandrel 2. This screen wire sheet has been cut in a triangular pattern at its end which, when completely wound will result in a varying cross-sectional area along the conductor length. To ensure transverse electrical conduction in the varying cross-section portion of the conductor, rectangular patches of solder 3 have been bonded to the screen wire sheet such that when the screen wire is wound, the solder can be bonded to windings contiguous thereto by applying appropriate heat.

Figure 2:
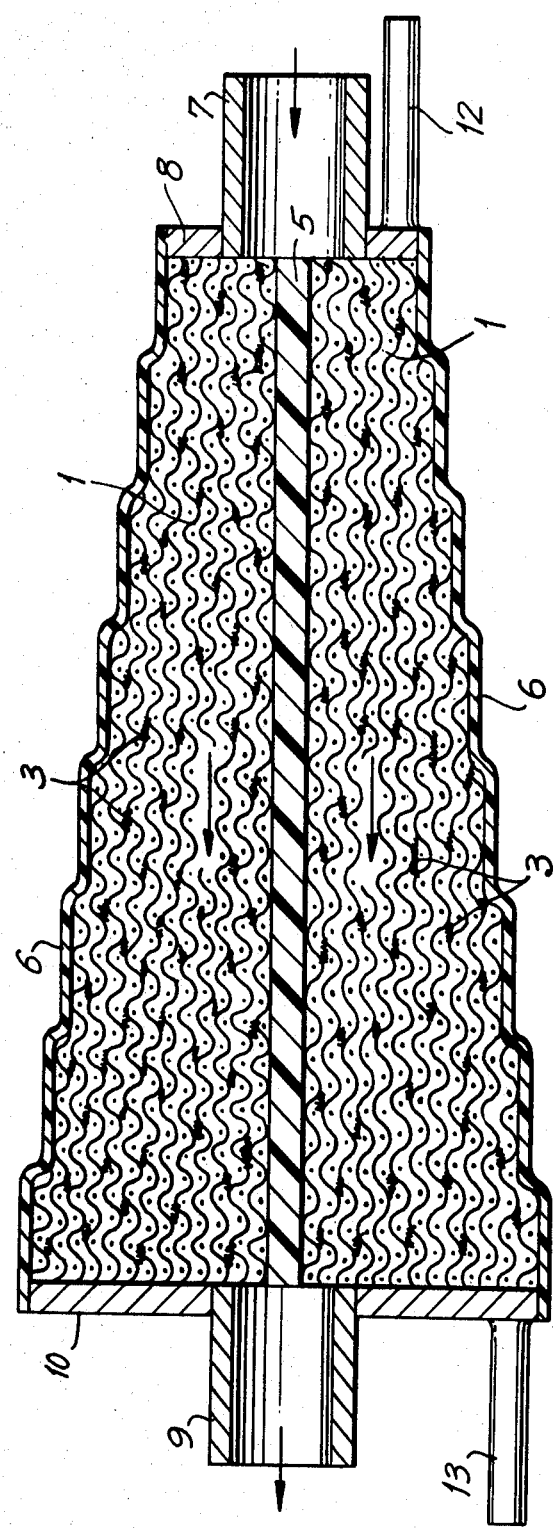
FIG. 2 is a cross-sectional perspective view of a conductor prepared according to this invention.

FIG. 2 is a longitudinal cross-sectional view of an embodiment of this invention comprising a wound screen wire conductor as shown in preparation in FIG. 1. The mandrel has been removed from screen wire portion 1 and replaced with an electrically nonconductive plug 5. Solder portions 3 are also shown in cross-section. This conductor has its exposed surface covered with an electrically nonconductive, gas impermeable covering 6 which is provided to ensure that cooling fluid which enters the conductor through conduit passage 7 mounted in electrically conductive end connector 8 passes through wound screen wire 1 and exits through conduit passage 9 in end connector 10. Polyurethane impregnated crepe paper has been found to be a suitable covering material. Terminal posts 12 and 13 are also mounted in end connectors 8 and 10 respectively. End connectors 8 and 10 are bonded to wound screen wire 1 by means of solder. If a large inner diameter hollow conductor is desired, as would result from using a large diameter mandrel, the inner surface of such a spirally wound hollow conductor can be covered with an electrically nondonductive, fluid impermeable material as is the outer surface, in lieu of the mandrel being replaced with a nonconductive plug.

EXAMPLE 1

In an example of the conductors of this invention, a conductor similar to that shown being wound in FIG. 1 may be prepared from spirally wound 90-10 brass, 30 mesh × 0.0135 inch diameter wire cut as shown in FIG. 1 to give a desired cross sectional variation when wound. End connectors as shown in FIG. 2 may be of solid copper or copper alloy and such end connectors joined to the spirally wound metal screen wire by means of solder. Electrically nonconductive gas impermeable covering also shown in FIG. 2 may be of polyurethane impregnated crepe paper. Terminal posts as well as gas conduit means shown in FIG. 2 could also be of solid copper or copper alloy. The electrically nonconductive plug shown in FIG. 2 would preferably be made of polytetrafluoroethylene. Solder portions 3 shown in FIG. 2 may be heated subsequent to winding to achieve bonding of contiguous screen wire layers which as heretofore stated would improve transverse electrical conductivity in the screen wire portion of the conductor. The size of such a conductor would be determined by its service requirements.

Although preferred embodiments of the invention have been described in detail, it is to be understood that modifications and variations may be effected without departing from the spirit and scope of the invention.

What is claimed is:

1. A porous metal, fluid cooled, electrical conductor comprising spirally wound electrically conductive porous metal sheet; means for introducing and removing electrical current joined to each end of such wound metal sheet; fluid impermeable, electrically nonconductive means disposed on at least the outer surface of said wound metal sheet; and fluid conduit means disposed at each end of said wound metal sheet arranged to introduce cold fluid at one end and discharge warmed fluid at the other end of said warmed porous metal sheet after flow therethrough.

2. A conductor as described in claim 1 wherein the wound metal sheet has a void space range of about 50 to 95 percent void.

3. A conductor as described in claim 1 wherein the porous metal sheet comprises metal screen wire.

4. A conductor as described in claim 1 wherein the wound porous metal sheet has a longitudinally varying cross-sectional area.

5. A conductor as described in claim 1 wherein the wound porous metal sheet has a longitudinally constant cross-sectional area.

6. A conductor as described in claim 1 wherein at least part of the contiguous porous metal sheet windings are metal bounded together.

7. A conductor as described in claim 6 wherein the bond comprises solder.

8. A conductor as described in claim 1 which conductor is hollow having an inner and outer surface, wherein the fluid impermeable electrically nonconductive means is disposed over said inner and outer surfaces.

* * * * *